United States Patent

Göller et al.

[11] 3,947,202
[45] Mar. 30, 1976

[54] APPARATUS FOR FILTERING MOLTEN PLASTICS AND FOR EXTRUDING PLASTIC STRANDS

[76] Inventors: Werner F. Göller, Am Heckerhof 57; Helge F. Luckenbach, Doerperhofstrasse 14, both of, 415 Krefeld; Rudolf Paul Fritsch, Goslarer Str. 58, 7 Stuttgart-31, all of Germany

[22] Filed: July 31, 1974

[21] Appl. No.: 493,261

[30] Foreign Application Priority Data
Aug. 2, 1973  Germany............................ 2339193

[52] U.S. Cl. ............... 425/185; 425/183; 425/198; 425/199
[51] Int. Cl.² ............................................ B29F 3/00
[58] Field of Search ........... 425/185, 197, 198, 199, 425/377, 183, 184

[56] References Cited
UNITED STATES PATENTS

| | | |
|---|---|---|
| 2,736,056 | 2/1956 | Toulmin, Jr. ................... 425/377 X |
| 2,771,636 | 11/1956 | McIntosh et al................... 425/185 |
| 2,838,084 | 6/1958 | Samler............................. 425/198 X |
| 3,007,199 | 11/1961 | Curtis .............................. 425/198 X |
| 3,264,685 | 8/1966 | Boggild et al...................... 425/183 |
| 3,583,453 | 6/1971 | Upmeier.......................... 425/199 X |
| 3,675,934 | 7/1972 | Heston............................. 425/199 X |

FOREIGN PATENTS OR APPLICATIONS

| | | |
|---|---|---|
| 1,490,131 | 8/1966 | France ............................... 425/199 |
| 1,079,771 | 8/1967 | United Kingdom |

*Primary Examiner*—Ronald J. Shore
*Attorney, Agent, or Firm*—Shenier & O'Connor

[57] ABSTRACT

Apparatus for filtering molten plastics and for extruding plastic strands has a filter combined with a die head into an interchangeable unit. Plastics strands are discharged from the die head. The interchangeable unit is movable transverse to the direction of flow of plastics material.

8 Claims, 2 Drawing Figures

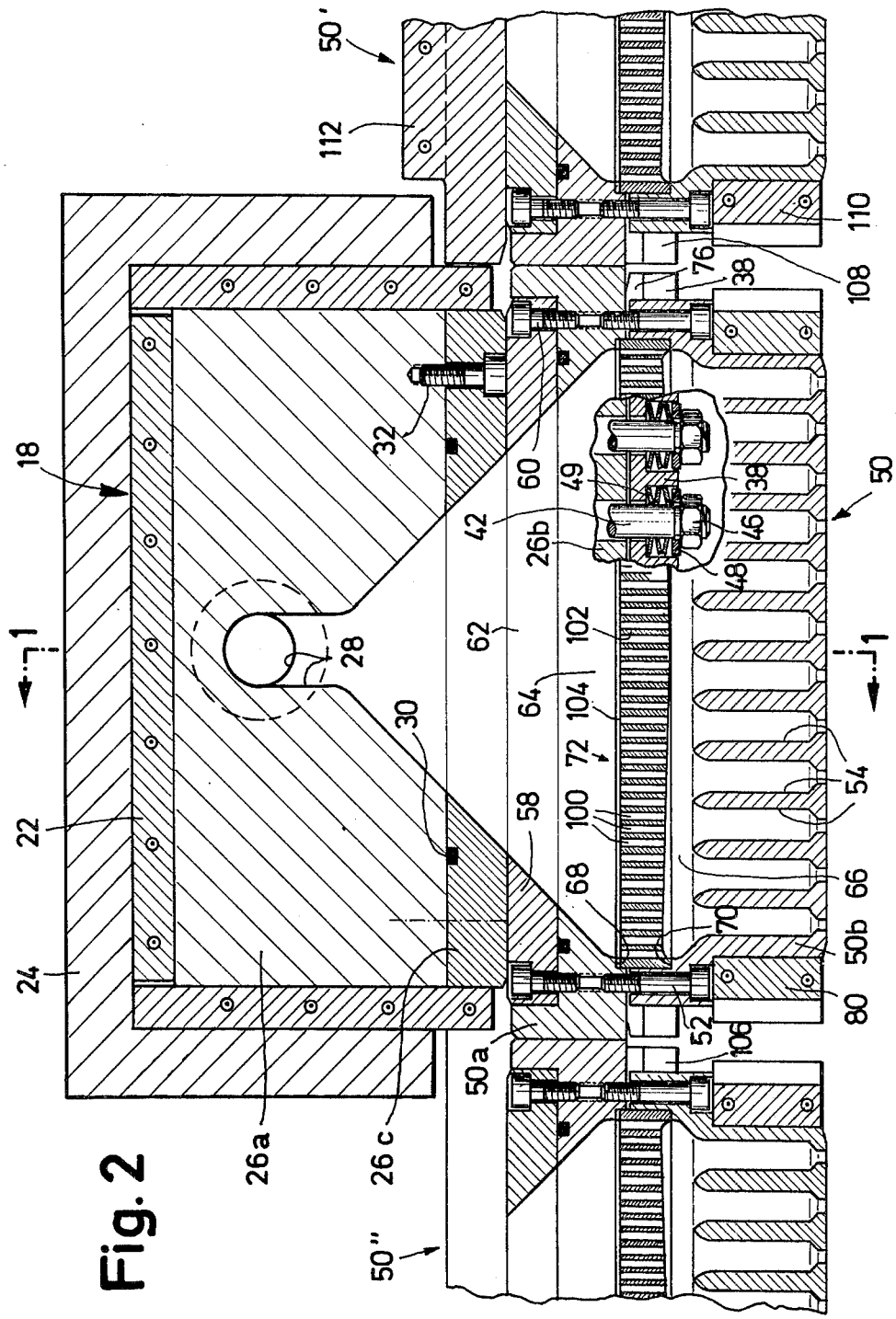

APPARATUS FOR FILTERING MOLTEN PLASTICS AND FOR EXTRUDING PLASTIC STRANDS

BACKGROUND OF THE INVENTION

The invention relates to apparatus for filtering molten plastics and for extruding plastics strands, more particularly for the production of plastics granulate, with a filter which is exchangeable by movement transverse to the stream of plastics and with a die head from which the plastics strands are discharged.

The production and processing of plastics frequently calls for filtration of the product. Known filter systems give rise to substantial difficulties which are due to the fact that changing the filter causes dirt to be returned into the product path while temperature-sensitive plastics may suffer from damage which ranges from discoloration to carbonisation. There are various reasons for thermal damage. In known devices the distances between the filter and the die head are relatively long so that the plastics material comes into contact with relatively large metal surface areas, even downstream of the filter, such metal surfaces having high temperatures since the entire device must naturally be heated. In order to minimise the size of such hot metal surfaces the diameter of pipes and ports through which molten plastics folows in known devices have been minimised but in the region of the filter whose surface area is made relatively large in the interests of a high throughput, this leads to the creation of dead zones in transition regions between small and large cross-sections of the heater device, the plastics material being also thermally damaged due to excessive dwell periods in such zones. Finally, there are difficulties in providing a seal for the filters, constructed as inserts in a slide, with respect thereto. Sealing is usually achieved by thrusting the filter insert against a seal surface by means of the pressure difference which occurs in operation; however, experience has shown that this cannot provide complete sealing, more particularly because the filter inserts must be inserted with some clearance into the slide in order to meet the demand for easy and rapid exchanging of the filters. The resultant gaps either cause undesirable bypassing of the filter or they form dead spaces in which molten plastics remains for a prolonged time and is thus thermally damaged. Changing the filter in known devices also causes relatively large amounts of air to be introduced into the plastics flow upstream and downstream of the filter.

SUMMARY OF THE INVENTION

It is an object of the invention to provide apparatus for filtering molten plastics and for extruding plastics strands which is such that the risk of thermal damage to the processed plastics is reduced.

According to the present invention there is provided apparatus for filtering molten plastics and for extruding plastics strands, including a filter combined, into an interchangeable unit, with a die head from which the plastics strands are discharged, the interchangeable unit being movable transverse to the direction of flow of plastics material.

Such apparatus can be used in the production of plastics granulates.

Apparatus embodying the invention can have the following advantages: the distance traversed by the molten plastics from the filter to the die of the combined filter and die head (sometimes referred to as the "filter die") is reduced to a minimum so that in practice it is not possible for the molten plastics to suffer any thermal damage downstream of the filter. Furthermore, in contrast with interchangeable filters of known construction the interchangeable unit comprising the filter and die head has only one surface instead of two which require sealing so that this step not merely simplifies construction and reduces sealing problems but also meets the demand for easy interchangeability of the filter in a more complete manner.

The invention also enables chambers, which are disposed upstream and downstream of the filter and are subject to different pressure levels, to be completely sealed with respect to each other by a positive connection so that bypassing of the filter is reliably avoided.

The construction according to the invention also permits the adoption of more optimum flow cross-sections for the molten plastics material because there is no need to restrict the flow cross-section downstream of the filter since the die head itself has a relatively large inlet cross-section. Furthermore, practically no air is introduced into the molten plastics when the filter die is changed because the filter die does not interrupt the plastics stream in the apparatus but is quasi-connected to the exit aperture of the device. There is also the additional advantage that the dies of the die head can be cleaned together with the filter.

As already mentioned, known devices of the kind described hereinbefore have two sliding surfaces which cooperate with the two end faces of the interchangeable filter in the sense of providing a seal and have ports upstream and downstream of the filter for the supply and discharge of molten plastics.

In a preferred embodiment of the invention the apparatus has a casing adapted to accommodate the plastics supply duct and having a slide surface into which the supply duct extends, the arrangement being that the die filter is resiliently pressed against the casing slide surface by means of a slide surface which incorporates its inlet port. Exceptionally accurate fits such as those required in apparatus of the known kind are therefore avoided.

It is advantageous to guide the die filter in guide rails which are resiliently prestressed in the direction towards the casing slide surface in order to facilitate the operation of exchanging the die filter and simultaneously to ensure that the die filter thrusts resiliently against the casing slide surface. The last-mentioned feature can be achieved with particular simplicity in terms of construction if the guide rails can be tilted about axes which are parallel to the guide rails.

In order to accelerate the exchange operation and to facilitate work concerned with the preparation for exchanging the die filter it is also advantageous if slide rails are provided, at least for retaining a die filter which is to be freshly inserted. The exchange operation is also accelerated if slide rails are also provided for retaining a die filter that has been exchanged. The slide rails for a die filter which is to be inserted and one that has just been exchanged are appropriately in alignment with the guide rails which maintain the die filter in the operational state. In such a construction the die filter which is in operation and is to be cleaned can be exchanged simply by the insertion of a cleaned, and where appropriate, preheated die filter into the operating position, the ejected die filter being still retained in the slide rails. The operation of exchanging the filters can be greatly accelerated by these means. Furthermore, a cleaned die filter which is to be freshly inserted can be preheated in the standby position and heating units which are to be mounted on the sides of the new die filter and are required to provide the operating state, can be mounted while the die filter is still in the standby position.

Particularly good sealing of a die filter which is to be inserted into the apparatus is obtained if all slide surfaces which are displaced with respect to each other in the course of a die filter changing operation are of a relatively soft material, more particularly aluminium bronze and on a hard material, more particularly hardened steel, respectively. It is appropriate to provide the slide surfaces of soft material on the die filter so that they can be remachined without difficulty if necessary.

While a change of filter in known apparatus of the kind described hereinbefore results in a prolonged interruption of the production of plastics strands this is not the case in the apparatus according to the invention; to completely prevent the ingress of extruded material into plant disposed downstream of the apparatus either during the operation of changing the die filter and briefly thereafter there is preferably provided a reversing device, more particularly in the form of a chute, under the die filter for the plastics strands and adapted to be adjusted between an operative and an inoperative position. The extruded material can be deflected by means of this reversing device, for example into a waste container, during the period in which the flow of material is disturbed by the die filter. Details of a suitable reversing device are disclosed in our copending patent application No.

BRIEF DESCRIPTION OF THE DRAWINGS

An embodiment of the present invention will now be described, by way of example only, with reference to the accompanying drawings in which:

FIG. 2 is a section through the apparatus along the line 2—2 of FIG. 1; the sectional plane for FIG. 1 is indicated in FIG. 2 at 1—1.

DESCRIPTION OF THE PREFERRED EMBODIMENT

Figure 1:
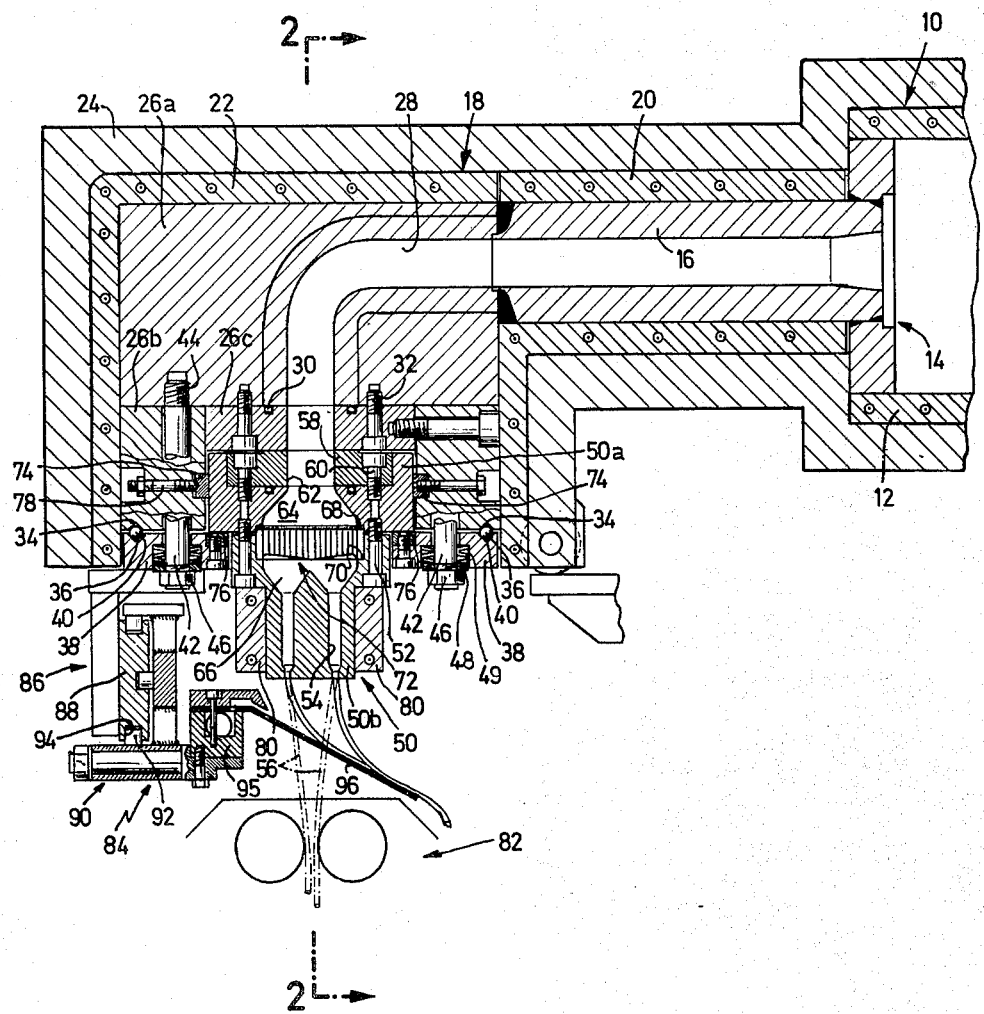
FIG. 1 is an axial section through the exit region of apparatus for filtering molten plastics and for extruding plastics strands in accordance with this invention.

FIG. 1 shows the exit zone of an extruder 10 which is provided with a heating jacket 12. A connecting pipe 16, through which the extruder communicates with a filtering and extruding device according to the invention and referenced in its entirety with the numeral 18, is connected to a nozzle 14 of the extruder. Heating jackets 20 and 22, which are electrically heated or can be fed, for example, with a liquid thermal medium, extend over the connecting pipe and the apparatus 18. An insulating jacket, referenced in its entirety with the numeral 24, is also provided.

The device 18 comprises a casing 26a to 26c which consists of several parts, and a supply duct 28, for molten plastics thrust by the extruder 10 into the connecting pipe 16, extending through the casing parts 26a and 26c. The casing parts 26a and 26c are sealed with respect to each other by means of a seal 30 and are joined to each other by means of countersunk screw fasteners 32. The casing parts 26b have longitudinal grooves 34 in which rods 36 are disposed but act as bearing elements. Guide rails 38 can be pivoted around the said rods, the guide rails being also provided with longitudinal notches 40 for bearing purposes. Screw-threaded bolts 42 which are mounted in tapped holes 44 of the casing part 26a extend through the guide rails 38 and the casing parts 26b, the bottom ends of the said bolts having screwthreads so that the guide rails 38 and casing parts 26b can be tightened against the casing part 26a by means of nuts 46. A stack of diaphragm springs 49 which bear on the guide rails 38 is situated under each of these nuts in addition to a washer 48.

A die filter, referenced in its entirety with the numeral 50, is slidably guided between the casing parts 26b and 26c and the guide rails 38 in a direction which is perpendicular to the plane of the drawing of FIG. 1. The die filter comprises a top 50a and a die head 50b which is mounted thereon by means of screw fasteners 52. The die head is provided with a series of die bores 54 through which a plurality of plastics strands 56 are simultaneously extruded. A sliding member 58 of aluminium bronze is inserted into the top 50a and mounted therein by means of countersunk screw fasteners 60. The sliding member 58 bears sealingly against the casing part 26c of hardened steel and is provided with an inlet port 62 which is in flush alignment with the bottom aperture of the inlet duct 28 when the die filter 50 is in the operating position illustrated in FIG. 2. In its bottom region the top part 50a is provided with a cavity 64 and the top region of the die head 50b has a cavity 66, both cavities being shouldered at 68 or 70 respectively. A filter, referenced in its entirety with the numeral 72, is clamped between the aforementioned shoulders, the construction of the filter being described in detail by reference to FIG. 2.

Since the top 50a of the die filter is to be constructed of hardened steel it cooperates with guide strips 74 and 76 of a soft material, which are recessed into the casing parts 26b and into the guide rails 38. The guide strips 76 as well as the right hand guide strip 74 are bolted in position while the left hand guide strip 74 can be readjusted by means of an adjusting screw 78.

As may be clearly seen by reference to FIG. 2 the height of the top 50a of the die filter 50 is dimensioned so that the guide rails 38 bear on the underside of the top part 50a with the full force of the diaphragm springs 49 so as to compensate for any tolerances resulting from a pivoting motion of the guide rails about the rods 36.

FIG. 1 also discloses two heating units 80, which are laterally attached alongside the die head 50b and are retained by means, not shown, on the die filter but can be easily removed therefrom. They are connected via connections also not shown, to a supply of electric power or liquid thermal medium, the said connections being flexible so as to permit sliding of the die filter 50 when the heating units are connected. A cooling device 82, which is only diagrammatically indicated, draws off the plastics strands 56 which are extruded from the die filter; these features represent prior art and it is therefore not necessary to describe them in detail. To prevent plastics reaching the cooling device in unusable form while the die filter is exchanged a reversing device, referenced in its entirety with the number 84 is attached to the bottom of the device 18 and is subject of our copending patent application so that it need only be briefly described in this context.

The reversing device is suspended from retaining means 86, mounted in a manner not shown on the device 18, and can be slid at right angles to the plane of the drawing of FIG. 1 along a rail 88 of the aforementioned retaining means. To this end it is provided with a guide frame 90 which is guided and retained by means of strips 92 in slots 94 of the rail 88. The guide frame 90 supports a chamber 95 which is disposed at an angle below the die filter and has a sheet metal chute 96 clamped therein. The top of the sheet metal chute can be provided with a film of water discharged via the chamber 95 which is connected to water mains, the film of water preventing the molten plastics from sticking.

If the reversing device 84 is not situated under a die filter 50 in the operative position the plastics strands 56 will pass into the cooling device 82 over the path indicated in dash dot lines. However, if the sheet metal chute 96 is driven under the die filter 50 or under the opening of the inlet duct 28 by means of a pneumatic cylinder, not shown, it will prevent molten plastics discharged from the device 18 in an undesirable form or composition from reaching the cooling device 82.

As may be seen by reference to FIG. 2 and more clearly by reference to FIG. 1 the filter 72 comprises a support member 102 containing ducts 100 and a filter layer 104 which bears upon the aforementioned support member 102. FIG. 2 also clearly shows the uniform increase of the flow cross-section for the molten plastics from the bottom zone of the inlet duct 28 to the zone of the filter 72 without any substantial restriction downstream of the filter so that the illustrated apparatus 18 constructed in accordance with the invention has no dead zones in which sensitive plastics materials could be thermally damaged due to excessive dwell periods in the heated device 18.

The drawings also clearly show that the distance between the filter 72 and the nozzle bores 54 is very short.

FIG. 2 also shows that slide rails 106 and 108 are provided as an extension of the guide rails 38 on both sides of the die filter which is in the operative position in order to retain a cleaned, preheated die filter 50' which is to be inserted into the device 18 and, where appropriate, a die filter 50'' which has just been ejected from the device 18 and is to be cleaned. One end of the resilient guide rails 38, but preferably both ends can be chamfered so that a die filter which is to be inserted into the rails can be inserted into the guide system formed by the guide rails even when these are pivoted upwardly by the diaphragm springs 50, even if the previously operated die filter had already been completely withdrawn from between the guide rails 38.

However, the normal operation for changing the die filter proceeds as follows:

A cleaned die filter 50' is inserted between the slide rails 108 (but these may of course also be the slide rails 106). Heating units 80 as shown in FIG. 1 can be mounted on the die filter and further heating units 110 can be mounted on the end faces of the die filter for preheating the same, the last mentioned heating units remaining on the die filter during the changing operation. A heating hood 112 may also be mounted but this must be removed prior to exchanging the die filter and must be held so that the die filter 50' can be slid away under the hood. The die filter 50' is slid under the device 18 by an actuating device not shown, more particularly a pneumatic cylinder, so that the inlet port 62 of the said device is in alignment with the bottom end of the inlet duct 28. This causes the previously operated die filter 50 to be pushed out of the guide rails 38 and to be thrust between the slide rails 106. It will be clear that the operation of changing can be performed with great rapidity so that extrusion of the plastics strands 56 is only briefly interrupted and practically no oxygen is introduced into the molten plastics material.

We claim:

1. Apparatus for filtering molten plastics and for extruding plastic strands including in combination, a casing formed with a slide surface, a plastics supply duct in said casing leading into said casing slide surface, an interchangeable unit comprising a filter and a die head from which plastic strands are discharged, said unit being formed with a slide surface having an inlet port therein, and means for mounting said unit on said casing with said slide surfaces in engagement for movement of said unit transverse to the direction of flow of plastics material, said mounting means comprising guide rails for receiving said unit and means for resiliently biasing said guide rails toward said casing resiliently to bias said slide surfaces into engagement.

2. Apparatus as claimed in claim 1, wherein the guide rails can be tilted about axes which are parallel to the guide rails.

3. Apparatus as claimed in claim 1, comprising slide rails for retaining at least one combined filter and die head which is to be newly inserted.

4. Apparatus as claimed in claim 1, comprising slide rails for retaining an interchanged combined filter and die head.

5. Apparatus as claimed in claim 1, comprising slide rails for retaining at least one combined filter and die head which is to be newly inserted and slide rails for retaining an interchanged combined filter and die head, wherein the slide rails are in alignment with the guide rails.

6. Apparatus as claimed in claim 1 wherein the slide surfaces which are displaced with respect to each other when a combined filter and die head is exchanged are of a relatively soft material and a relatively hard material respectively.

7. Apparatus as claimed in claim 6 wherein the slide surfaces of soft material are mainly provided on the combined filter and die head.

8. Apparatus as claimed in claim 1 comprising, under the combined filter and die head, a reversing device for the plastics strands, said reversing device being adjustable between an operative position and an inoperative position.

* * * * *